(12) United States Patent
Albasheir et al.

(10) Patent No.: US 10,397,758 B2
(45) Date of Patent: Aug. 27, 2019

(54) FUNCTION SELECTION BASED ON UTILIZATION LEVEL IN 5G ENVIRONMENTS

(71) Applicant: T-Mobile USA, Inc., Bellevue, WA (US)

(72) Inventors: Suliman Albasheir, Issaquah, WA (US); Karunakalage Viraj Rakitha Silva, Renton, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/698,199

(22) Filed: Sep. 7, 2017

(65) Prior Publication Data
US 2019/0075431 A1    Mar. 7, 2019

(51) Int. Cl.
| | |
|---|---|
| *H04M 3/42* | (2006.01) |
| *H04W 4/20* | (2018.01) |
| *H04W 24/08* | (2009.01) |
| *H04W 48/00* | (2009.01) |
| *H04L 29/08* | (2006.01) |
| *H04W 8/20* | (2009.01) |

(52) U.S. Cl.
CPC ............. *H04W 4/20* (2013.01); *H04L 67/101* (2013.01); *H04W 24/08* (2013.01); *H04W 48/17* (2013.01); *H04W 8/20* (2013.01)

(58) Field of Classification Search
CPC .................................. H04W 4/02; H04W 8/18

USPC ............................................ 455/414.1, 456.1
See application file for complete search history.

(56) References Cited

U.S. PATENT DOCUMENTS

2017/0339609 A1* 11/2017 Youn ...................... H04W 76/11
2018/0184324 A1*  6/2018 Raleigh ............... H04L 41/0893

FOREIGN PATENT DOCUMENTS

WO    WO2017142362 A1    8/2017

OTHER PUBLICATIONS

3rd Generation Partnership Project: Technical Specification Group Services and System Aspects; System Architecture for the 5G System; Stage 2, Release 15, 3GPP TS 23.501 v1.2.0, Jul. 2017.
(Continued)

*Primary Examiner* — Temica M Beamer
(74) *Attorney, Agent, or Firm* — Lee & Hayes, P.C.

(57) ABSTRACT

Systems, devices, and techniques described herein are directed to function selection based on utilization level in mobile networks. In particular, the systems, devices, and techniques can be implemented in fifth generation (5G) mobile networks to provide intelligent selection of a user plane function (UPF) based on utilization levels, capability information, and/or locality information. UPFs can provide indications of a utilization level to a network resource function (NRF), which can manage a database of the various utilizations levels of various UPFs. Based on a current, historical, or expected utilization of one or more UPFs, and/or based on the services requested and various locations of the services in a network, the NRF can select and provide, in part, a UPF to the UE, so that the UPF can carry user traffic associated with the UE.

20 Claims, 8 Drawing Sheets

(56) References Cited

OTHER PUBLICATIONS

"3rd Generation Partnership Project: Technical Specification Group Services and System Aspects; System Architecture for the 5G System; Stage 2 (Release 15)," 3GPP TS 23.501 v1.0.0, Sections 5.8.2 and 6.2.3, retrieved at <<https://portal.3gpp.org/ngppapp/createtdoc.aspx?mode=view&contributionuid=sp-170384>>, Jun. 2017, 147 pages.

NIT Docomo, "TS 23.502: Clarifications to the Service Request Procedure", retrieved at <<http://www.3gpp.org/ftp/tsg_sa/WG2_Arch/TSGS2_122BIS_Sophia_Antipolis/Docs/>>, S2-175684, 3GPP TSG SA WG2 Meeting #123, Sofia Antipolis, France, Aug. 14, 2017, 16 pages.

NIT Docomo, et al., "TS 23.501: Resolving EN for SM and SMF/UPF Selection Related to Network Slicing Aspect", retrieved at <<http://www.3gpp.org/ftp/tsg_sa/WG2_Arch/TSGS2_122BIS_Sophia_Antipolis/Docs/>>, S2-175670, 3GPP TSG SA WG2 Meeting #123, Sofia Antipolis, France, Aug. 14, 2017, 7 pages.

Nokia, et al. "New SID: Enhancing Topology of SMF and UPF in 5G Networks", retrieved at <<http://www.3gpp.org/ftp/tsg_sa/WG2_Arch/TSGS2_122BIS_Sophia_Antipolis/Docs/>>, S2-175358, 3GPP TSG SA WG2 Meeting #123, Sofia Antipolis, France, Aug. 14, 2017, 5 pages.

The PCT Search Report and Written Opinion dated Dec. 6, 2018 for PCT Application No. PCT/US2018/047753, 10 pages.

\* cited by examiner

FUNCTION SELECTION BASED ON UTILIZATION LEVEL IN 5G ENVIRONMENTS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to function selection based on utilization levels in mobile networks. In particular, the systems, devices, and techniques can be implemented in fifth generation (5G) mobile networks to provide intelligent selection of a user plane function (UPF) based on utilization levels, capability information, and/or locality information. For example, one or more UPFs can provide indications of a utilization level of the UPF to a network resource function (NRF), which can manage a database of the various utilizations levels of various UPFs. Based on a current, historical, or expected utilization of one or more UPFs, and/or based on the services requested and various locations of the services in a network, the NRF can select and provide, in part, a UPF to the UE, so that the UPF can carry user traffic associated with the UE.

The various functions and components discussed herein can be implemented either as a network element on a dedicated hardware, as a software instance running on a dedicated hardware, or as a virtualized function instantiated on an appropriate platform, such as a cloud infrastructure. Thus, in the case where a UPF is implemented as a software instance or as a virtualized function (e.g., as a virtual machine), efficiencies can be gained by balancing a load provided to the various UPFs in the network, instead of or in addition to overallocation of resources and/or dynamic sizing of the software instance or virtual resources. For example, as a utilization level of a UPF approaches 100% utilization (e.g., of CPU utilization, bandwidth utilization, memory utilization, number of allowable sessions, etc.), additional requests for the UPF can be rerouted to other UPFs having a lower utilization level. In some cases, a UPF operating at a high utilization level can lead to dropped packets, increased latency, or overall decrease in QoS (quality of service) or QoE (quality of experience). Thus, the function selection based on utilization level can prevent reductions to the level of service provided to various UEs transmitting or receiving traffic associated with a UPF.

The system, devices, and techniques described herein can be applied to selecting any function in a mobile network based at least in part on utilization levels. For example, various components of a fifth generation (5G) mobile network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can provide utilization levels, capability information, locality information, etc., associated with the various functions to a network resource function (NRF) (or other component), for example, such that the NRF or other component can select a particular function of a plurality of possible components providing the same function based on the utilization levels of the particular component. Thus, the system, devices, and techniques broadly apply to selecting network functions, and is not limited to a particular context or function, as discussed herein.

The systems, devices, and techniques described herein can improve a functioning of a network by reducing network congestion, dropped packets, or dropped calls due to over-utilization of resources. Further, the systems, devices, and techniques can reduce a size of components (e.g., processing capacity) by obviating or reducing any need to over-allocate resources to ensure spare capacity to reduce congestion. Further, selecting functions based on utilization levels can reduce signaling overhead associated with dynamically allocating a size of a virtual instance. In some instances, the architecture described herein facilitates scalability to allow for additional components to be added or removed while maintaining network performance. In some instances, optimal functions can be selected in connection with handovers (e.g., intracell or intercell) to balance a load on network functions to provide improved Quality of Service (QoS) for network communications. These and other improvements to the functioning of a computer and network are discussed herein.

The systems, devices, and techniques described herein can be implemented in a number of ways. Example implementations are provided below with reference to the following figures.

Figure 1:
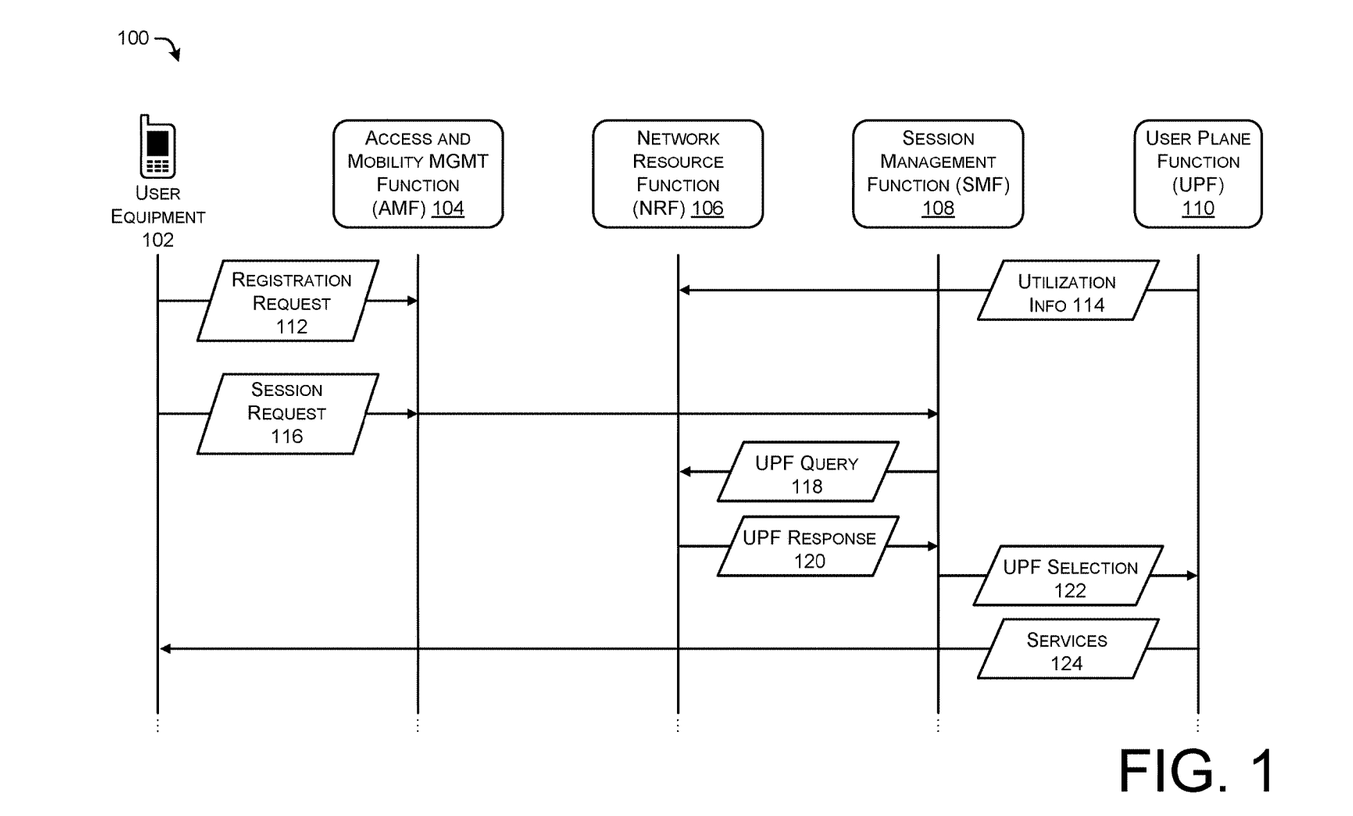
FIG. 1 is a diagram illustrating example signaling between a user equipment (UE) and various components of a mobile network, such as a fifth generation mobile network, as described herein.

FIG. 1 is a diagram illustrating example signaling 100 between a user equipment (UE) and various components of a mobile network, such as a fifth generation (5G) mobile network, as described herein. As illustrated, the signaling 100 includes interactions between a user equipment (UE) 102, an access and mobility management function (AMF) 104, a network resource function (NRF) 106, a session management function (SMF) 108, and a user plane function (UPF) 110. As can be understood in the context of this disclosure, the example signaling 100 is not limited to the components described in FIG. 1, and can include other components and operations.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

In general, the AMF 104 can be implemented as a network function including functionality to provide UE-based authentication, authorization, mobility management, etc., to various UEs. In some instances, the AMF 104 can include functionality to terminate a radio access network (RAN) control plane interface between the UE 102 and other functions on the network. In some instances, the AMF 104 can include functionality to perform registration management of the UE 102 in a network, connection management, reachability management, mobility management, access authentication, access authorization, security anchor functionality (e.g., receiving and/or transmitting security keys during registration/authorization), and the like.

In general, the NRF 106 can be implemented as a network function including functionality to support service discovery (e.g., receive a network function discovery request and provide information associated with the discovered network function instances to a requesting entity). In some instances, the NRF can receive utilization information, capability information, etc. from various network functions, such as the UPF 110, to provide such utilization information to the other components discussed herein. Further, the NRF 106 can select, assign, implement, or otherwise determine network functions to be used in a network based at least in part on utilization information, as discussed herein.

In general, the SMF 108 can be implemented as a network function including functionality to manage communication sessions by and between UEs, and/or to provide internet protocol (IP) addresses to the UEs. In some instances, the SMF 108 can select a UPF of a plurality of UPFs, or the SMF 108 can utilize a UPF provided by the NRF 106, as discussed herein.

In general, the UPF 110 can be implemented as a network function including functionality to control data transfer between the UE 102 and the various components of the network. In some instances, the UPF 110 can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be a plurality of UPFs associated with a network and/or with the UE 102.

Turning to the signaling 100, the UE 102 can transmit a registration request 112 to the AMF 104. For example, the UE 102 can transmit the registration request 112 in response to the UE 102 being powered on, or in response to the UE 102 being exposed to a network. As discussed in connection with FIG. 2, the AMF 104, the NRF 106, the SMF 108, and the UPF 110 can collectively be referred to as a network.

In some instances, the registration request 112 can include additional signaling between the UE 102, the AMF 104, and/or other network components to authenticate the UE 102 (e.g., to determine that the UE 102 is authorized to operate on the network).

At a same or different time as the registration request 112, the UPF 110 can transmit utilization information 114 to the NRF 106. In some instances, the utilization information 114 can include information including, but not limited to: CPU utilization level; memory utilization level; active or reserved bandwidth; a number of active sessions; a number of allowable sessions; historical usage; instantaneous usage; dropped packets; packet queue size; delay; Quality of Service (QoS) level; and the like. Further, the utilization information 114 can include a status of the UPF 110 (e.g., online, offline, schedule for maintenance, etc.). In some instances, the UPF 110 can transmit the utilization info 114 at any regular or irregular interval. In some instances, the UPF 110 can transmit the utilization info 114 in response to a request from the NRF 106, and/or in response to a change in one or more utilization levels above or below a threshold value.

Further, the signaling 100 can include receiving utilization information associated with any network function in a communications network, as discussed herein. In some instances, any network function discussed herein can be selected, determined, or implemented in the network based on the utilization information.

Next, the UE 102 can transmit a session request 116 to the AMF 104, which in turn can transmit the session request 116 to the SMF 108. In some instances, the session request 116 can include a request to initiate a voice communication, a video communication, a data communication, and the like, by and between the UE 102 and other services or devices in the network.

At least partially in response to receiving the session request 116, the SMF 108 can transmit a UPF query 118 to the NRF 106. In some instances, the UPF query 118 can include information including, but not limited to: a type of session requested by the UE 102 (e.g., voice, video, bandwidth, emergency, etc.); services requested by the UE 102; a location of the UE 102; a location of a destination of the session requested by the UE 102; a request for a single UPF or a plurality of UPFs; and the like.

In some instances, at least partially in response to receiving the UPF query 118, the NRF 106 can provide a UPF response 120 to the SMF 108. In some instances, the UPF response 120 can include one or more identifiers associated with one or more UPFs that are available to provide services to the UE 102. In some instances, the UPF response 120 can be based at least in part on the session request 116 and/or on the utilization info 114 received from the UPF 110 (as well as other UPFs, as discussed herein). As can be understood in the context of this disclosure, the UPF response 120 can include an identifier of a single UPF (e.g., the UPF 110) to be utilized in a communication, and in some instances, the UPF response 120 can include a plurality of UPFs that are available/capable to accommodate the session request 116. In some instances, the UPF response 120 can include utilization level(s), capability information, locality information, etc. associated with one or more UPFs.

Based at least in part on the UPF response 120, the SMF 108 can select a UPF (e.g., in a case where a plurality of UPF identifiers are provided to the SMF 108) or can utilize the UPF provided by the NRF 106 for a communication session. The SMF 108 can select a UPF and can transmit a UPF selection 122 to the UPF (e.g., the UPF 110) that has been selected and/or designated to provide communications to the UE 102.

At least partially in response to the UPF selection 122, the UPF 110 can provide services 124 to the UE 102. As discussed herein, the UPF 110 can facilitate data transfer to and/or from the UE 102 to facilitate communications such as voice communications, video communications, data communications, etc.

In accordance with various embodiments described herein, the terms "user equipment (UE)," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, a user can further utilize the UE 102 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the 3$^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be include in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The UE 102 is configured to utilize various radio access networks (RANs) in order to access the IMS core. In general, the IMS core is agnostic to the access technology that is used to connect a UE to the IMS core. In this manner, the UE 102 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 102 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage. Additional details of an example network and aspects of the function selection are discussed below in connection with FIG. 2.

Figure 2:
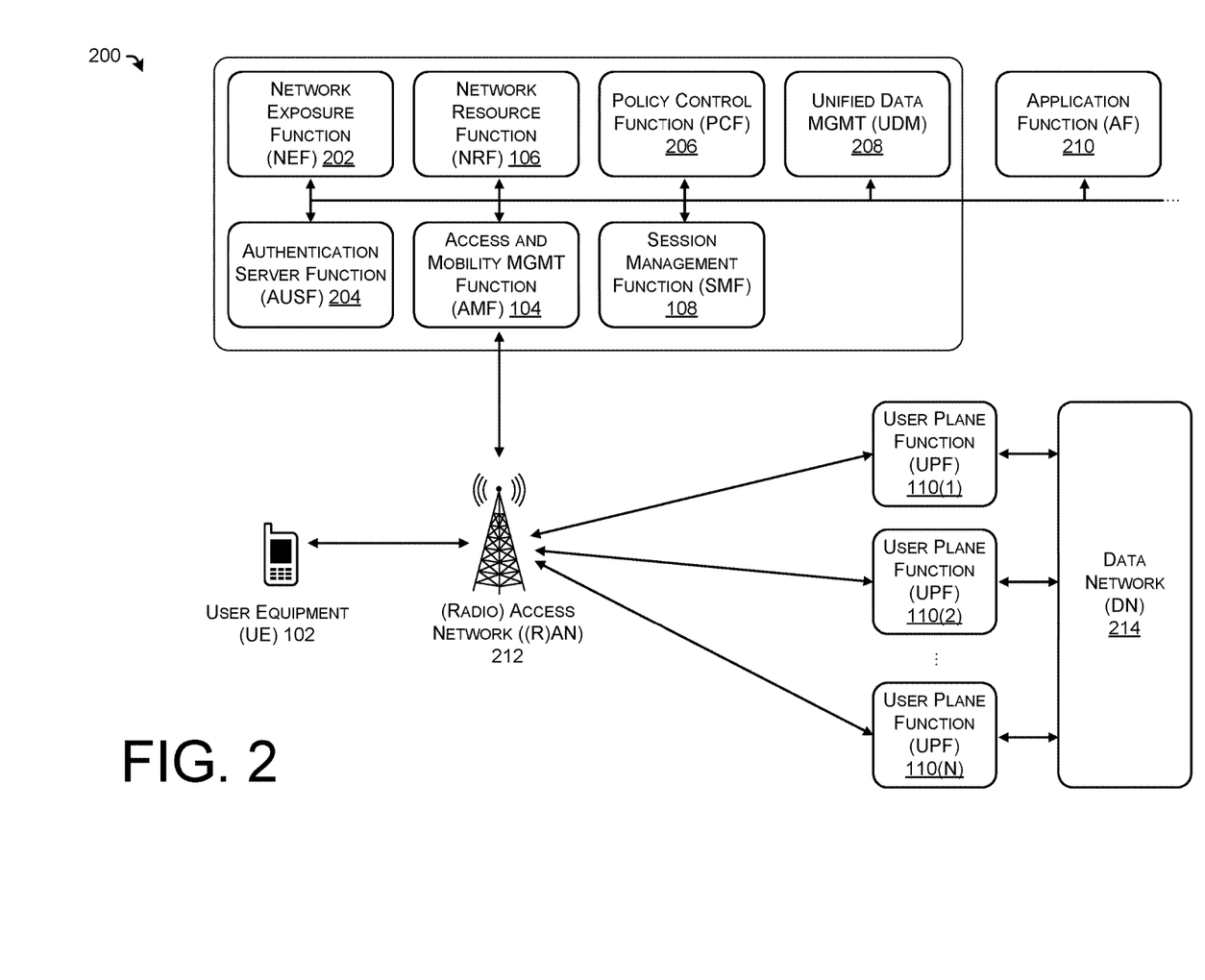
FIG. 2 illustrates an example environment including user equipment and various components implementing the function selection based on utilization level, as described herein.

FIG. 2 illustrates an example environment 200 including user equipment and various components implementing the function selection based on utilization level, as described herein. For example, the environment 200 includes the user equipment (UE) 102, the access and mobility function (AMF) 104, the network resource function (NRF) 106, the session management function (SMF) 108, and user plane functions (UPFs) 110(1), 110(2), . . . , 110(N) (where N is an integer), as discussed in connection with FIG. 1, as well as a network exposure function (NEF) 202, an authentication server function (AUSF) 204, a policy control function (PCF) 206, a unified data management (UDM) 208, an application (AF) 210, a (radio) access network ((R)AN) 212, and a data network (DN) 214.

In general, the NEF 202 can be implemented as a network function including functionality to securely expose services and/or capabilities provided by and amongst the various network functions, as discussed herein. In some instances, the NEF 202 receives information from other network functions and can store the received information as structured data using an interface to a data storage network function.

In general, the AUSF 204 can be implemented as a network function including functionality to provide authentication to various devices in the network. For example, the AUSF 204 can request device credentials (e.g., security key(s)), verify that a device is authorized to connect to a network, and/or control access to the network based on the device credentials.

In general, the PCF 206 can be implemented as a network function including functionality to support unified policy framework to govern network behavior, provide policy rules to control plane functions and/or enforce such rules, and/or implement a front end to access subscription information relevant for policy decisions in a data repository.

In general, the UDM 208 can be implemented as a network function including functionality to process authentication credentials, handle user identification processing, manage registration and/or mobility, manage subscriptions between a UE and a carrier, and or manage SMS (short message service) data.

In general, the AF 210 can be implemented as a network function including functionality to route traffic to/from applications operating on the network, facilitate accessing the network exposure function (NEF) 202, and interact with the policy framework for policy control in connection with the PCF 206.

In general, the (R)AN 212 can be implemented as a variety of technologies to provide wired and/or wireless access to the network, as discussed herein. In some instances, the (R)AN 212 (also referred to as a RAN 212) can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the RAN 212 can include any number and type of base stations representing any number and type of macrocells, microcells, picocells, or femtocells, for example, with any type or amount of overlapping coverage or mutually exclusive coverage.

In general, the DN 214 can include any public or private network(s), such as the internet.

In general, the NRF 106 can receive utilization information associated with any of the various network functions herein to select, assign, implement, or otherwise determine which network function of a plurality of network functions to use based at least in part on utilization information. As discussed herein, the systems, devices, and techniques discussed herein are not limited to selecting a UPF of a plurality of UPFs, for example.

In general, the devices and network functions illustrated in the environment 200 can be communicatively coupled via one or more control planes which can pass controls and signaling by and between the various components discussed herein. Further, the environment 200 can include a plurality of each of the various functions (e.g., the SMF 108 can represent a plurality of SMFs, for example). The environment 200 can further include additional functions and is not limited to those represented in FIG. 2.

Figure 3A:
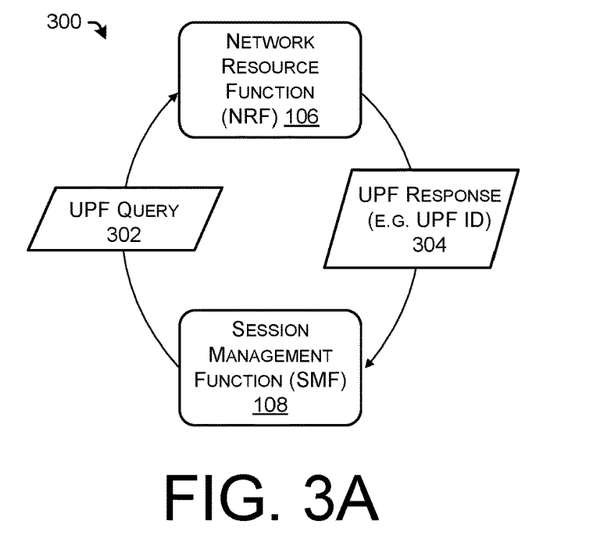
FIG. 3A illustrates an example of a request for a user plane and a response including a user plane identifier.

FIG. 3A illustrates an example 300 of a request for a user plane and a response including a user plane identifier. For example, the session management function (SMF) 108 can transmit a UPF query 302 to the network resource function (NRF) 106. In some instances, the UPF query 302 can be transmitted at least partially in response to the SMF 108 receiving a request for a UPF to establish a communication involving a UE. In some instances, the UPF query 302 can be transmitted via a control plane between the SMF 108 and the NRF 106. In some instances, the UPF query 302 can include information associated with, but not limited to, a type of communication to be established, a request for a particular QoS level, a request for bandwidth, an indication of location of the initiating UE, a request for services to be provided by the UPF (e.g., video compression, encryption, etc.), and the like.

At least partially in response to receiving the UPF query 302, the NRF 106 can transmit a UPF response 304 to the SMF 108. In some examples, the NRF 106 can select a UPF SMF 108 based at least in part on the information contained in or associated with the UPF query 302. For example, the NRF 106 can select a UPF based at least in part on utilization levels provided separately by one or more UPFs and a type of communication, location information, etc. contained in the UPF query 302. In some instances, the UPF response 304 can include a UPF identifier, such as an IP address, network address, or other identifier to uniquely identify the UPF to provide traffic for a communication. As discussed herein, at least partially in response to receiving the UPF response 304, the SMF 108 can control the UPF to provide services to a UE.

Figure 3B:
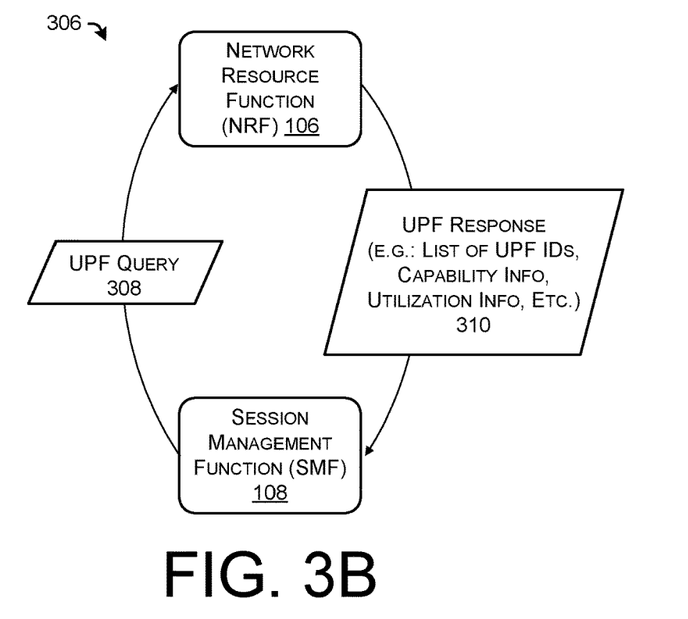
FIG. 3B illustrates an example of another request for a user plane and a response including a plurality of user plane identifiers, capability information, utilization information, and location information, for example, as discussed herein.

FIG. 3B illustrates an example 306 of another request for a user plane and a response including a plurality of user plane identifiers, capability information, utilization information, and location information, for example, as discussed herein. Similar to the UPF query 302 in FIG. 3A, the SMF 108 can transmit a UPF query 308 to the NRF 106. In some instances, the UPF query 308 can be the same query as the UPF query 302. That is, the UPF query 308 can include information associated with, but not limited to, a type of communication to be established, a request for a particular QoS level, a request for bandwidth, an indication of a location of the initiating UE, a request for services to be provided by the UPF, etc. In some instances, the UPF query 308 can include less information than discussed above, and can include simply a request for one or more UPFs. In some instances, the UPF query 308 can specifically request a plurality of available/capable UPFs so that the SMF 108 can select a UPF, as discussed herein.

At least partially in response to the UPF query 308, the NRF 106 can transmit a UPF response 310 to the SMF 108. In some instances, the UPF response 310 can include, but is not limited to, a list of UPF identifiers, capability information associated with individual UPFs, utilization information associated with individual UPFs, location information associated with individual UPFs, etc. Based at least in part on the UPF query 308, the SMF 108 can select a UPF to be used in a communication based at least in part on communication information such as a type of communication to be requested, locations of devices (e.g., initiating devices, destination devices, etc.), a type of data network associated with the communication, bandwidth levels, requested QoS levels, subscriber information, etc.

Figure 4:
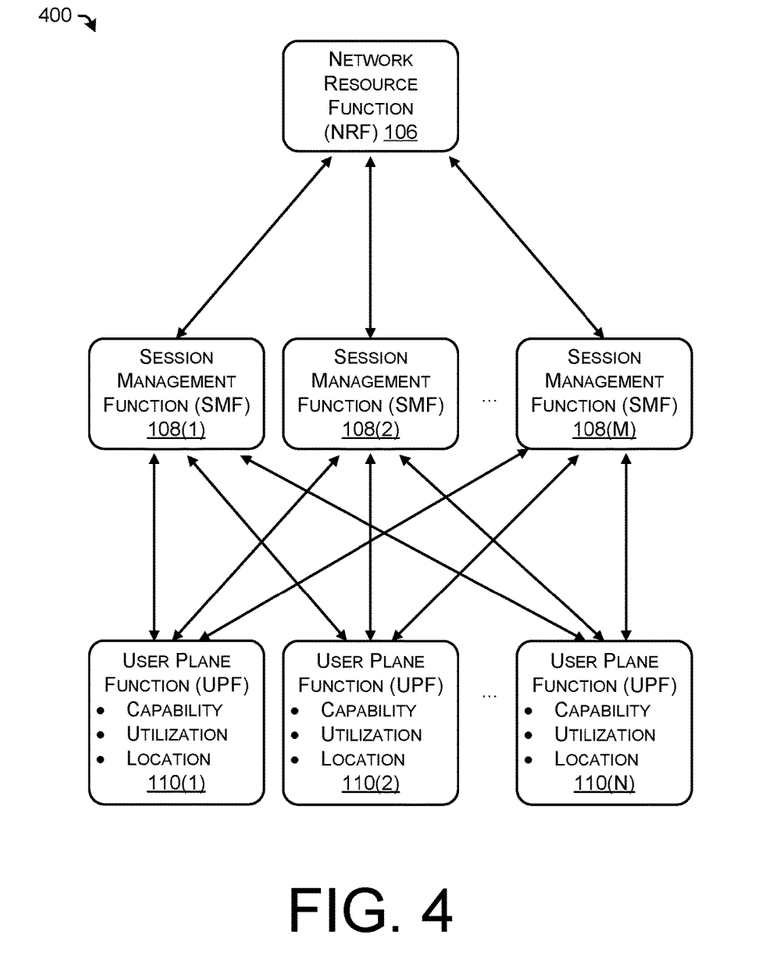
FIG. 4 illustrates an example topology of a network resource function (NRF) providing functionality to a plurality of session management functions (SMFs) and user plane functions (UPFs), as discussed herein.

FIG. 4 illustrates an example topology 400 of a network resource function providing functionality to a plurality of session management functions and user plane functions, as discussed herein. The example topology 400 illustrates how the various network functions can be distributed between hardware components, software components, and/or virtualized functions, which can introduce the challenges of balancing requests for network functions within a network.

As illustrated, the network resource function (NRF) 106 can interact with a plurality of session management functions (SMFs) 108(1), 108(2), . . . , 108(M) (where M is an integer that may be a same or different number than N) (also collectively referred to as SMFs 108). In turn, the SMFs 108(1), 108(2), . . . , 108(M) can be communicatively coupled with a plurality of user plane functions (UPFs) 110(1), 110(2), . . . , 110(N) (collectively referred to as UPFs 110). As discussed herein, the UPFs 110 can provide utilization information, capability information, location information, etc. to the NRF 106 so that the NRF 106 can provide UPFs (and/or UPF identifiers, the information discussed above, etc.) to the SMFs 108 in an intelligent manner.

Further, the example topology 400 provides a flexible framework which allows various functions to be added and removed from the network during operation so that workload can be distributed in a seamless manner. For example, if a UPF 110(1) is scheduled for maintenance, the NRF 106 can easily instruct the SMFs 108 not to use the UPF 110(1) at a particular time (or during a window of time corresponding to the schedule maintenance), or can provide other UPFs (e.g., the UPF 110(2), . . . , 110(N)) to the SMFs 108 to facilitate communications. After maintenance is performed on the UPF 110(1), for example, the NRF 106 can again instruct the SMFs 108 to utilize the UPF 110(1) for communications.

The techniques discussed herein are not limited to selecting a UPF based on utilization levels. Instead, the disclosure applies to selecting any network function based on any metrics or information associated with the network functions. For example, the NRF 106 can select a SMF of the SMFs 108 based on utilization levels, capability information, location information, etc., of the individual SMFs 108. In such an example, the SMFs 108 would provide utilization information to the NRF 106 so that the NRF 106 can determine and select an appropriate SMF for use.

Figure 5:
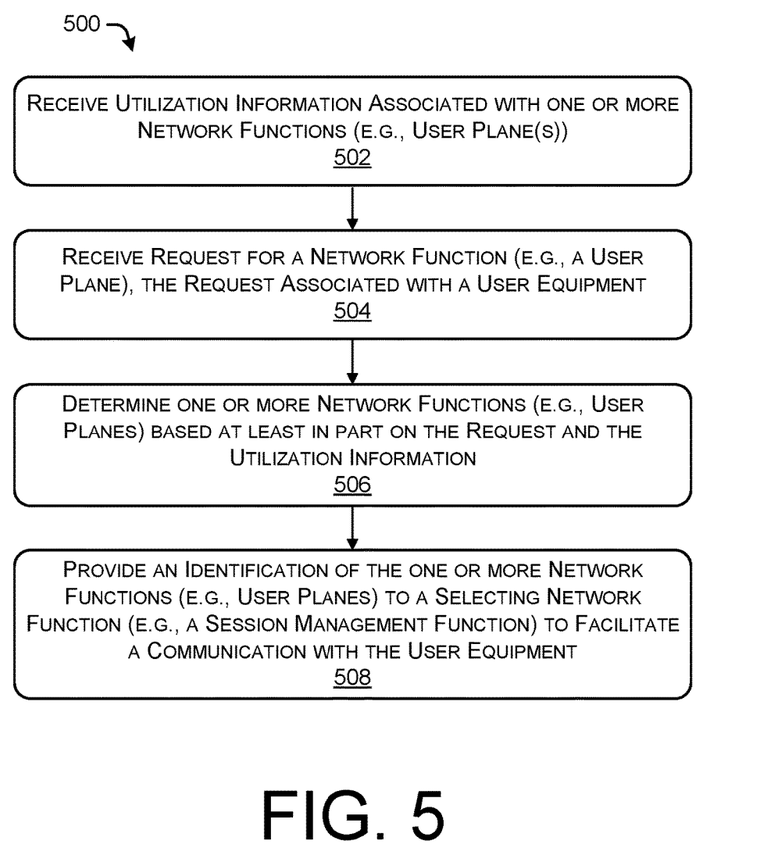
FIG. 5 illustrates an example process for selecting a network function, such as a user plane function (UPF), based on utilization information.
Figure 6:
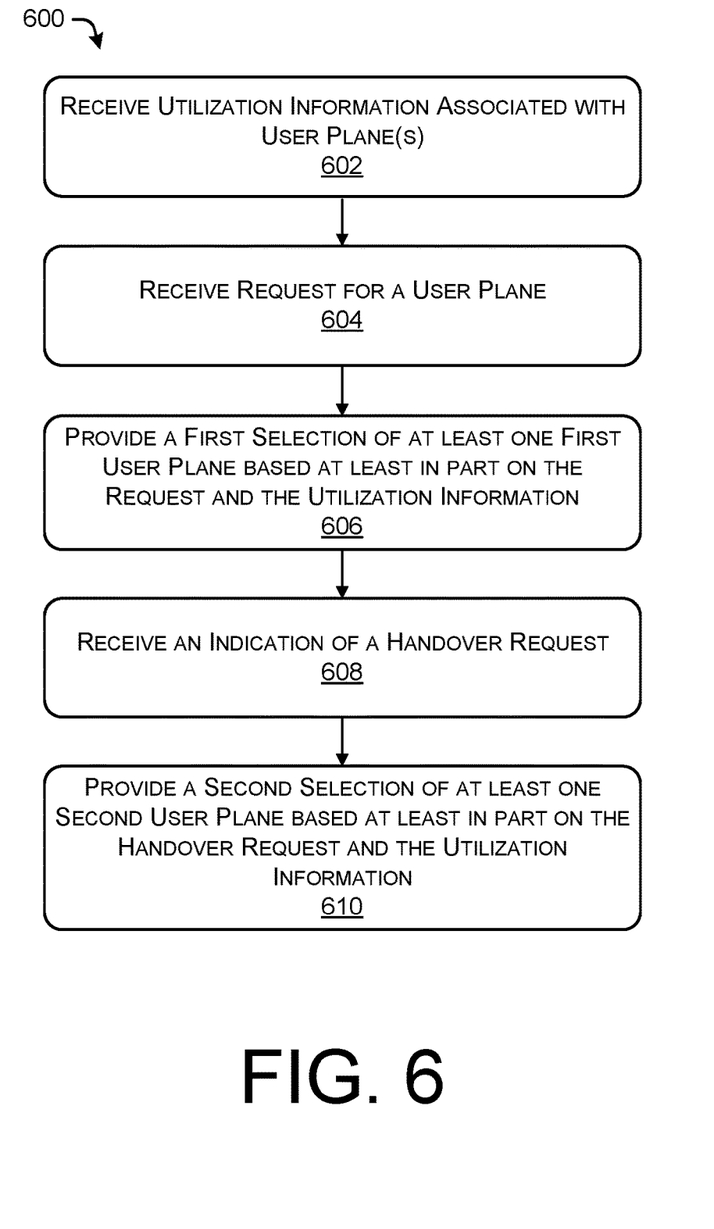
FIG. 6 illustrates an example process for selecting a user plane function (UPF) based on utilization information during a handover.
Figure 7:
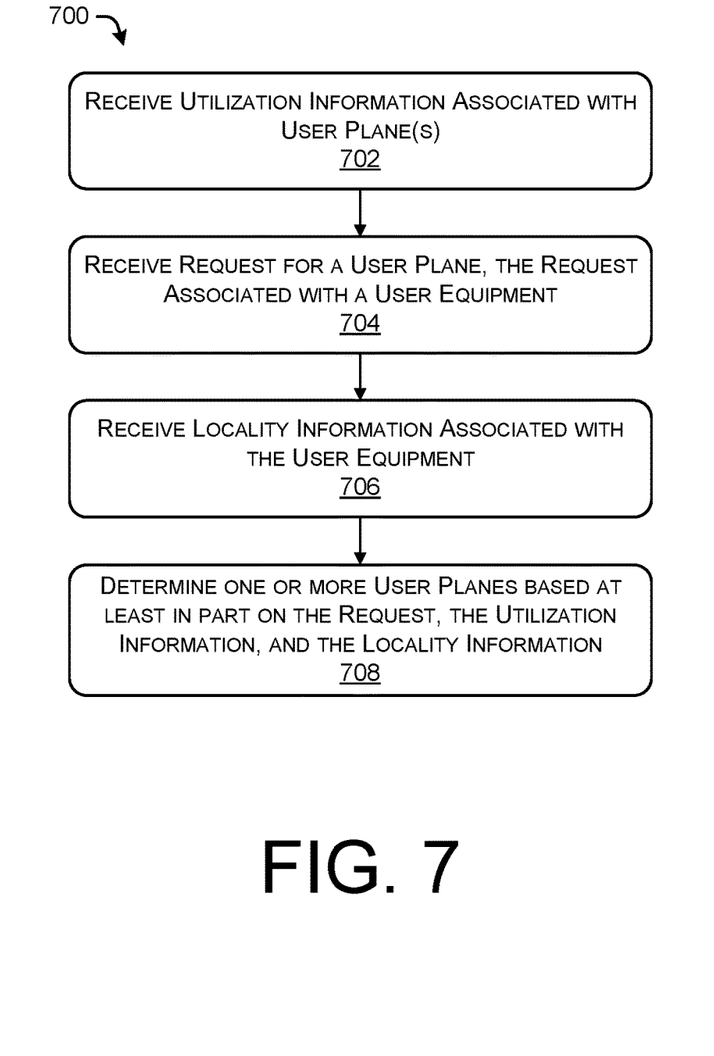
FIG. 7 illustrates an example process for selecting a user plane function (UPF) based on utilization information and locality information.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for selecting a network function, such as a user plane function, based on utilization information. The example process 500 can be performed by the network resource function (NRF) 106 (or another component), in connection with other components discussed herein. Some or all of the process 500 can be performed by one or more devices or components in the environment 200, for example.

At operation 502, the process can include receiving utilization information associated with one or more network functions, such as one or more user planes. Although discussed in the context of a UPF, the process 500 and other descriptions in this application apply equally to other network functions, such as a network exposure function (NEF), a policy control function (PCF), a unified data management (UDM), an authentication server function (AUSF), an access and mobility management function (AMF), a session management function (SMF), an application function (AF), and the like. In one example, user planes in a network (e.g., UPFs 110(1), 110(2), . . . , 110(N)) can transmit utilization information to the NRF (e.g., the NRF 106). In some instances, the NRF 106 can request utilization information from various UPFs (or any network function) on a regular schedule, upon receipt of a request to initiate a communication, and the like. In some instances, the UPF (or any network function) can transmit utilization information upon determining that a utilization level has changed more than a threshold amount compared to a previous utilization level. In some instances, utilization information can include, but is not limited to, one or more of: CPU utilization (e.g., % utilization), bandwidth utilization, memory utilization, number of allowable sessions, number of active sessions, historical utilization information, expected utilization levels, latency, current QoS of active sessions, and the like.

Further, in some instances, the operation 502 can include receiving capability information associated with the user plane(s) (or any network function), location information associated with the user plane(s) (or any network function), etc. Such utilization information, capability information, location information, etc. can be stored in a database accessible by the NRF 106.

At operation 504, the process can include receiving a request for a network function, such as a user plane, the request associated with a user equipment. For example, the operation 504 can include receiving a request from a session management function (SMF) or an access and mobility management function (AMF) (or any network function) for a user plane (or any network function) to initiate a communication for a user equipment. In some instances, the request can indicate a number of user planes (or any network function) to be provided by the NRF (e.g., one or many). In some instances, the request can include information associated with the communication, such as a type of the communication, locations of the UE and/or the destination of the communication, specialized services (e.g., video encoding, encryption, etc.) requested in association with the communication, a bandwidth of the communication, a minimum QoS of the communication, and the like. In some instances, the request can be based at least in part on a request initiated by the UE and provided to the AMF, the SMF, or any network function.

At operation 506, the process can include determining one or more network functions (e.g., user planes) based at least in part on the request and the utilization level. For example, the operation 506 can include determining that a first user plane (or any network function) is associated with a first utilization level (e.g., 80% CPU utilization) and a second user plane (or any network function) is associated with a second utilization level (e.g., 30% utilization level). Further the operation 506 can include determining that the first utilization level is above a utilization threshold (e.g., 70% or any value) such that addition assignments of UEs to the UPF (or any network function) may degrade a quality of connections associated with first UPF (or any network function). Accordingly, the operation 506 can include determining that the first UPF (or any network function) is to be selected to provide data traffic for the UE.

As can be understood herein, there may be a variety of algorithms or ways to determine which user planes (or any network function) are to be selected as available for a communication. In some instances, the operation 506 can include determining that the utilization level of the second user plane (or any network function) (e.g., 30%, discussed above) is lower than the utilization level of the first user plane (or any network function) (e.g., 80%, discussed above), and accordingly, can determine that the second user plane (or any network function) is to be selected for the communication.

In some instances, the operation 506 can include determining a plurality of user planes (or any network function) that are available for a communication (e.g., that have a utilization level below a threshold value). In some instances, the user planes (or any network function) can be selected based on a proximity to the UE, capabilities requested by the UE, etc. In some instances, the operation 506 can include ranking or prioritizing individual ones of the plurality of user planes (or any network function) as most appropriate to be selected for the communication.

At operation 508, the process can include providing an identification of the one or more user planes (or any network function) to a session management function (SMF) (or any selecting network function) to facilitate a communication with the user equipment. For example, the operation 508 can include providing an address or other identifier corresponding to one or more UPFs (or any one or more network functions) to an SMF (or any selecting network function) in the network. In the case where one user plane (or any network function) is provided, the SMF (or any selecting network function) may utilize the explicit user plane (or any network function) identified by the NRF. In the case where more than one user plane (or any network function) is provided, the identification may include additional information to allow the SMF (or any selecting network function) to select a user plane (or any network function), as discussed herein.

FIG. 6 illustrates an example process for selecting a user plane function based on utilization information during a handover. The example process 600 can be performed by the network resource function (NRF) 106 (or another component), in connection with other components discussed herein. Some or all of the process 600 can be performed by one or more devices or components in the environment 200, for example.

At operation 602, the process can include receiving utilization information associated with one or more user planes. Similar to the operation 502 discussed above, the operation 602 can include the user plane(s) providing utilization information to a network resource function (NRF).

At operation 604, the process can include receiving a request for a user plane. Similar to the operation 504, the operation 604 can include receiving a request from an access and mobility management function (AMF) that is communicatively coupled with a UE.

At operation 606, the process can include providing a first selection of at least one first user plane based at least in part on the request and the utilization information. Similar to the operations 506 and/or 508, the operation 606 can include the providing, allocating, and/or selecting at least one user plane based on utilization information to balance a load across a plurality of available user planes. In some instances, the operation 606 can include establishing a communication for the UE at a first radio access network (RAN) utilizing the first user plane.

At operation 608, the process can include receiving an indication of a handover request. For example, as a UE moves about an environment, a signal quality can decrease between the UE and the first RAN. Accordingly, the network or the UE can determine that a handover should occur, based on one or more of, but not limited to: signal strength of an anchor connection (e.g., a signal strength of the first RAN); signal strength of a target RAN (e.g., a signal strength of a second RAN); latency; UE speed/direction; traffic level(s); QoS; etc. In some instances, the operation 608 can include determining that a new user plane is required/desired based at least in part on the indication of the handover request.

At operation 610, the process can include providing a second selection of at least one second user plane based at least in part on the handover request and the utilization information. For example, the at least one second user plane can include user planes suitable and available to facilitate a communication with the UE. In some instances, the operations 608 and 610 can be repeated as a UE moves about an environment (and/or in response to initiate a handover based on UPF maintenance, for example). That is, the operations can be repeated continuously or periodically to determine a user plane to facilitate a communication while balancing a load of the user planes.

FIG. 7 illustrates an example process 700 for selecting a user plane function based on utilization information and locality information. The example process 700 can be performed by the network resource function (NRF) 106 (or another component), in connection with other components discussed herein. Some or all of the process 700 can be performed by one or more devices or components in the environment 200, for example.

At operation 702, the process can include receiving utilization information associated with one or more user planes. The operation 702 can be similar to or the same as the operations 502 and 602, respectively. In some instances, as discussed above, the operation 702 can include receiving capability information associate with the user plane(s), location information associate with the user planes, etc.

At operation 704, the process can include receiving a request for a user plane, the request associated with a user equipment. In some instances, the operation 704 can be similar to the operations 504 and 604, as discussed above.

At operation 706, the process can include receiving locality information associated with the user equipment. For example, the operation 706 can include receiving a current location of the UE, and expected location of the UE, a speed/direction of the UE, etc. In some instances, locality information can be based at least in part on GPS information associated with the UE, Wi-Fi triangulation associated with the UE, timing advance of signals sent and/or received by the UE, etc.

At operation 708, the process can include determining one or more user planes based at least in part on the request, the utilization information, and the locality information. For example, based upon a location of the UE and a location of an available UPF, the UE/UPF combination can have an associated delay. Further, a utilization level (e.g., a relatively high utilization level) associated with the UPF can introduce additional delay. Based at least in part on the request (e.g., defining requirements for the UPF based on the intended communication), utilization information (e.g., % CPU utilization, % memory utilization, number of available session, etc.), and location information (e.g., a location of the UE and of the various available UPFs), the operation 708 can determine an optimal combination of UE/UPF to substantially maximize QoS. By way of example, the operation 708 can determine that a first UPF is located closer to a UE than a second UPF, and that the first UPF should not be selected as the UPF to service the UE if the utilization level is higher for the first UPF compared to the second UPF. Of course, any number of factors can be incorporated into the determination of selecting the various user planes, as discussed herein.

Figure 8:
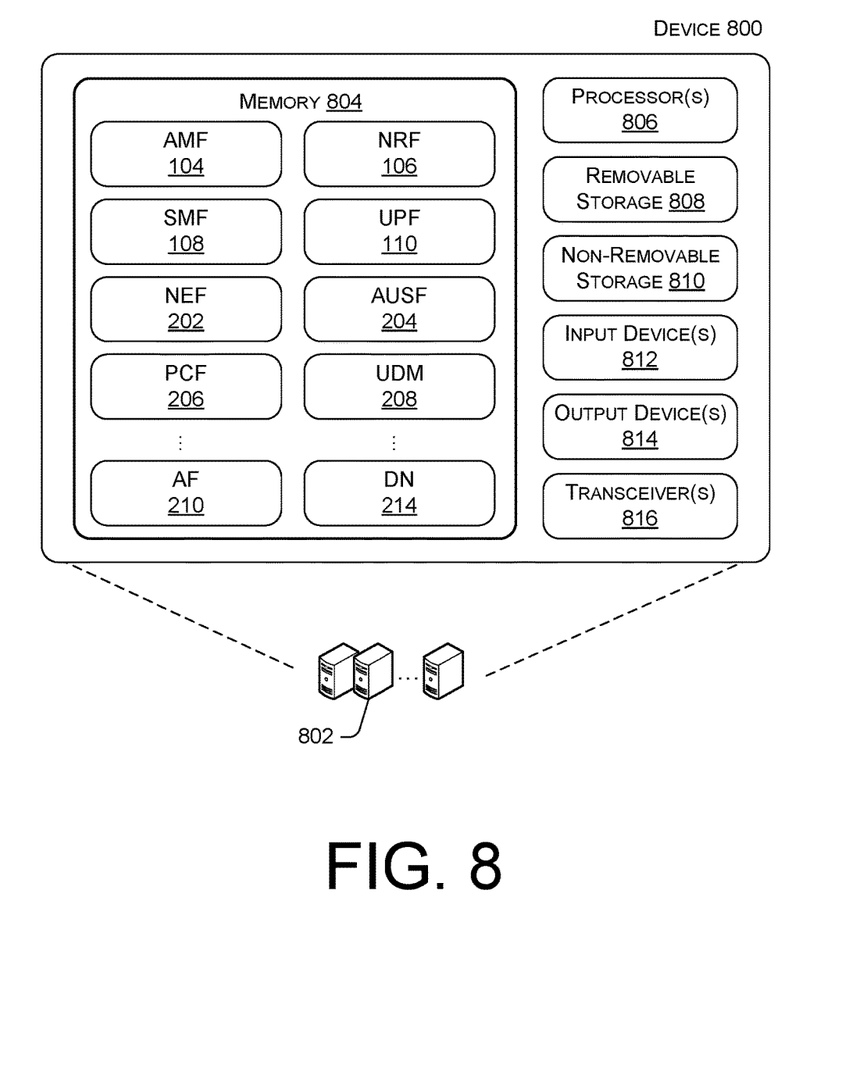
FIG. 8 illustrates an example device to implement the function selection based on utilization levels, as described herein.

FIG. 8 illustrates an example device 800 to implement the function selection based on utilization levels, as described herein. In some embodiments, some or all of the functionality discussed in connection with FIGS. 1-7 can be implemented in the device 800. Further, the device 800 can be implemented as a server computer 802, a network element on a dedicated hardware, as a software instance running on a dedicated hardware, or as a virtualized function instantiated on an appropriate platform, such as a cloud infrastructure, and the like. It is to be understood in the context of this disclosure that the device 800 can be implemented as a single device or as a plurality of devices with components and data distributed among them.

As illustrated, the device 800 comprises a memory 804 storing the access and mobility management function (AMF) 104, the network resource function (NRF) 106, the session management function (SMF) 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 to provide functionality to the device 800 to facilitate improved function selection based on utilization level, as described herein. Also, the device 800 includes processor(s) 806, a removable storage 808 and non-removable storage 810, input device(s) 812, output device(s) 814, and transceiver(s) 816.

Aspects of the access and mobility management function (AMF) 104, the network resource function (NRF) 106, the session management function (SMF) 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 are discussed above with connection with at least FIGS. 1 and 2. In general, these functions comprise aspects of a 5G mobile network.

In various embodiments, the memory 804 is volatile (such as RAM), non-volatile (such as ROM, flash memory, etc.) or some combination of the two. The access and mobility management function (AMF) 104, the network resource function (NRF) 106, the session management function (SMF) 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 stored in the memory 804 can comprise methods, threads, processes, applications or any other sort of executable instructions. The access and mobility management function (AMF) 104, the network resource function (NRF) 106, the session management function (SMF) 108, the user plane function (UPF) 110, the network exposure function (NEF) 202, the authentication server function (AUSF) 204, the policy control function (PCF) 206, the unified data management (UDM) 208, the application function (AF) 210, and the data network (DN) 214 can also include files and databases.

In some embodiments, the processor(s) 806 is a central processing unit (CPU), a graphics processing unit (GPU), or both CPU and GPU, or other processing unit or component known in the art.

The device 800 also includes additional data storage devices (removable and/or non-removable) such as, for example, magnetic disks, optical disks, or tape. Such additional storage is illustrated in FIG. 8 by removable storage 808 and non-removable storage 810. Tangible computer-readable media can include volatile and nonvolatile, removable and non-removable media implemented in any method or technology for storage of information, such as computer readable instructions, data structures, program modules, or other data. Memory 804, removable storage 808 and non-removable storage 810 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 800. Any such tangible computer-readable media can be part of the device 800.

The device 800 also can include input device(s) 812, such as a keypad, a cursor control, a touch-sensitive display, voice input device, etc., and output device(s) 814 such as a display, speakers, printers, etc. These devices are well known in the art and need not be discussed at length here.

As illustrated in FIG. 8, the device 800 also includes one or more wired or wireless transceiver(s) 816. For example, the transceiver(s) 816 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 816 can utilize multiple-input/multiple-output (MIMO) technology. The transceiver(s) 816 can comprise any sort of wireless transceivers capable of engaging in wireless, radio frequency (RF) communication. The transceiver(s) 816 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
receiving utilization information associated with a plurality of user plane functions, individual ones of the plurality of user plane functions configurable to carry data associated with at least one communication associated with at least one user equipment;
receiving, from a session management function, a request for a user plane, the request associated with a user equipment;
determining, by a network resource function, one or more user plane functions of the plurality of user plane functions to provide to the session management function based at least in part on the utilization information; and
providing an identification of the one or more user plane functions to the session management function to facilitate a communication with the user equipment.

2. The system of claim 1, wherein the one or more user plane functions is a single user plane function, and wherein determining the one or more user plane functions includes selecting the single user plane function from the plurality of user plane functions based on the utilization information associated with the single user plane function indicating the single user plane function has a capacity to facilitate the communication with the user equipment.

3. The system of claim 1, wherein the one or more user plane functions includes at least a first user plane function and a second user plane function, and wherein the identification of the one or more user plane functions includes at least:
 a first identifier associated with the first user plane function;
 a second identifier associated with the second user plane function;
 a first utilization level associated with the first user plane function; and
 a second utilization level associated with the second user plane function.

4. The system of claim 1, wherein the one or more user plane functions are virtualized instances operating on a computing device.

5. The system of claim 1, wherein the utilization information is first utilization information, and wherein the operations further comprise:
 receiving second utilization information associated with a plurality of session management functions; and
 selecting the session management function from the plurality of session management functions based at least in part on the second utilization information.

6. A system comprising:
 one or more processors;
 a memory; and
 one or more components stored in the memory and executable by the one or more processors to perform operations comprising:
  receiving utilization information associated with a plurality of user plane functions;
  receiving a request for a user plane function, the request associated with a user equipment;
  determining, based at least in part on the utilization information, one or more user plane functions of the plurality of user plane functions capable of satisfying the request; and
  providing an identification of the one or more user plane functions to a session management function to facilitate a communication with the user equipment.

7. The system of claim 6, wherein the one or more user plane functions is a first user plane function, the operations further comprising:
 determining that a utilization level associated with a second user plane function is above a threshold utilization level; and
 determining that the second user plane function is incapable of satisfying the request based at least in part on the utilization level being above the threshold utilization level.

8. The system of claim 6, the operations further comprising ranking the one or more user plane functions according to a utilization level corresponding to an ability of an individual user plane function to facilitate the communication with the user equipment, wherein the identification includes the ranking of the one or more user plane functions.

9. The system of claim 6, wherein the request for the user plane is a first request for a first user plane function, and wherein the one or more user plane functions are one or more first user plane functions, the operations further comprising:
 receiving a second request for a second user plane function, the second request associated with a handover associated with the user equipment; and
 determining, based at least in part on the utilization information and the second request, one or more second user plane functions of the plurality of user plane functions capable of satisfying the request.

10. The system of claim 6, wherein the utilization information includes at least one of:
 a processor usage level of a user plane function of the plurality of user plane functions;
 a memory usage level of the user plane function;
 a number of active sessions of the user plane function;
 a quality of service associated with one or more communications associated with the user plane function; and
 a packet queue length associated with the user plane function.

11. The system of claim 6, wherein the utilization information includes at least a status of an individual user plane function of the plurality of user plane functions, the operations further comprising:
 determining that the status indicates the individual user plane function is scheduled for maintenance; and
 preventing the individual user plane from being selected as one of the one or more user plane functions of the plurality of user plane functions capable of satisfying the request.

12. The system of claim 6, wherein determining the one or more user plane functions of the plurality of user plane functions capable of satisfying the request is based at least in part on a type of communication associated with the request.

13. The system of claim 6, wherein determining the one or more user plane functions of the plurality of user plane functions capable of satisfying the request is based at least in part on one or more of a first location of the user equipment or a second location of the one or more user plane functions.

14. The system of claim 6, wherein the utilization information is first utilization information, and wherein the operations further comprise:
 receiving second utilization information associated with a plurality of network functions, the plurality of network functions including one or more of:
  a plurality of network exposure functions,
  a plurality of policy control functions,
  a plurality of unified data management functions,
  a plurality of authentication server functions,
  a plurality of access and mobility management functions, or
  a plurality of session management functions; and
 selecting an individual network function of the plurality of network functions based at least in part on the second utilization information, wherein the individual network function provides at least one function to facilitate the communication with the user equipment.

15. A processor-implemented method comprising:
 receiving utilization information associated with a plurality of user plane functions;
 receiving a request for a user plane function, the request associated with a user equipment;
 determining, based at least in part on the utilization information, one or more user plane functions of the plurality of user plane functions capable of satisfying the request; and
 providing an identification of the one or more user plane functions to a session management function to facilitate a communication with the user equipment.

16. The processor-implemented method of claim 15, wherein the one or more user plane functions is a first user plane function, the processor-implemented method further comprising:

determining that a utilization level associated with a second user plane function is above a threshold utilization level; and     determining that the second user plane function is incapable of satisfying the request based at least in part on the utilization level being above the threshold utilization level.

17. The processor-implemented method of claim 15, wherein the one or more user plane functions is a single user plane function, and wherein the processor-implemented method further comprises includes selecting the single user plane function from the plurality of user plane functions based on the utilization information associated with the single user plane function indicating the single user plane function has a capacity to facilitate the communication with the user equipment.

18. The processor-implemented method of claim 15, wherein the one or more user plane functions includes at least a first user plane function and a second user plane function, and wherein the identification of the one or more user plane functions includes at least:

a first identifier associated with the first user plane function;

a second identifier associated with the second user plane function;

a first utilization level associated with the first user plane function; and     a second utilization level associated with the second user plane function.

19. The processor-implemented method of claim 15, wherein determining the one or more user plane functions of the plurality of user plane functions capable of satisfying the request is based at least in part on a type of communication associated with the request.

20. The processor-implemented method of claim 15, wherein determining the one or more user plane functions of the plurality of user plane functions capable of satisfying the request is based at least in part on a location of the one or more user plane functions.

\* \* \* \* \*